(12) United States Patent
Gormley

(10) Patent No.: US 11,725,581 B2
(45) Date of Patent: Aug. 15, 2023

(54) AIRCRAFT PROPULSION SYSTEM WITH VARIABLE AREA INLET

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 89 days.

(21) Appl. No.: 17/358,957

(22) Filed: Jun. 25, 2021

(65) Prior Publication Data
US 2022/0412256 A1 Dec. 29, 2022

(51) Int. Cl.
*F02C 7/042* (2006.01)
*B64D 33/02* (2006.01)

(52) U.S. Cl.
CPC .............. *F02C 7/042* (2013.01); *B64D 33/02* (2013.01)

(58) Field of Classification Search
CPC ................................. F02C 7/042; B64D 33/02
See application file for complete search history.

(56) References Cited

U.S. PATENT DOCUMENTS

| | | | |
|---|---|---|---|
| 2,677,232 A | 5/1954 | Collins | |
| 2,876,621 A | 3/1959 | Bogert | |
| 2,955,414 A | 10/1960 | Hausmann | |
| 3,058,693 A | 10/1962 | Doak | |
| 3,172,253 A | 3/1965 | Schelp | |
| 3,176,462 A | 4/1965 | Eckert | |
| 3,199,810 A | 8/1965 | Stroud | |
| 3,400,902 A | 9/1968 | King | |
| 3,495,605 A | 2/1970 | Gunnarson | |
| 3,664,612 A | 5/1972 | Skidmore | |
| 3,974,648 A | 8/1976 | Kepler | |
| 4,007,891 A | 2/1977 | Sorensen | |
| 4,047,911 A * | 9/1977 | Krojer | F02C 7/05 55/306 |
| 4,132,240 A | 1/1979 | Frantz | |
| 4,620,679 A | 11/1986 | Karanian | |
| 5,014,933 A | 5/1991 | Harm | |
| 5,881,758 A | 3/1999 | Koncsek | |
| 6,276,632 B1 | 8/2001 | Sanders | |

(Continued)

FOREIGN PATENT DOCUMENTS

FR 1204525 A 1/1960
WO 2009115674 A2 9/2009

OTHER PUBLICATIONS

EP search report for EP22181379.3 dated Nov. 2, 2022.

*Primary Examiner* — Lorne E Meade
(74) *Attorney, Agent, or Firm* — Getz Balich LLC

(57) ABSTRACT

An assembly for an aircraft propulsion system includes a variable area inlet with a fixed structure and a moveable structure. The variable area inlet is configured to open and close an airflow inlet passage into the aircraft propulsion system. The moveable structure is configured to move axially along a centerline between an aft position and a forward position. The moveable structure includes an inlet lip structure and a deflector. When the moveable structure is in the aft position, the airflow inlet passage is closed, and the deflector is at least partially recessed into the fixed structure. When the moveable structure is in the forward position, the airflow inlet passage is opened axially between an aft end of the inlet lip structure and a forward end of the fixed structure, and a forward end of the deflector is disposed axially at the forward end of the fixed structure.

19 Claims, 15 Drawing Sheets

(56) References Cited

U.S. PATENT DOCUMENTS

| | | |
|---|---|---|
| 6,793,175 B1 | 9/2004 | Sanders |
| 7,837,142 B2 | 11/2010 | Chase |
| 8,181,905 B2 | 5/2012 | McDonough |
| 8,690,097 B1 | 4/2014 | Huynh |
| 9,908,633 B2 | 3/2018 | Huynh |
| 10,107,196 B2 | 10/2018 | Devine |
| 10,221,764 B2 | 3/2019 | Labrecque |
| 11,149,637 B2 * | 10/2021 | Todorovic .............. B64D 29/06 |
| 11,390,393 B2 * | 7/2022 | Cochran ................. F02C 7/042 |
| 11,428,123 B2 * | 8/2022 | Rose ........................ F02C 7/04 |
| 11,441,482 B2 * | 9/2022 | Lacko ..................... F02C 7/042 |
| 2017/0321633 A1 | 11/2017 | Boileau |
| 2018/0371996 A1 | 12/2018 | Hoisington |
| 2020/0385135 A1 * | 12/2020 | Cochran ................. F02C 7/047 |

* cited by examiner

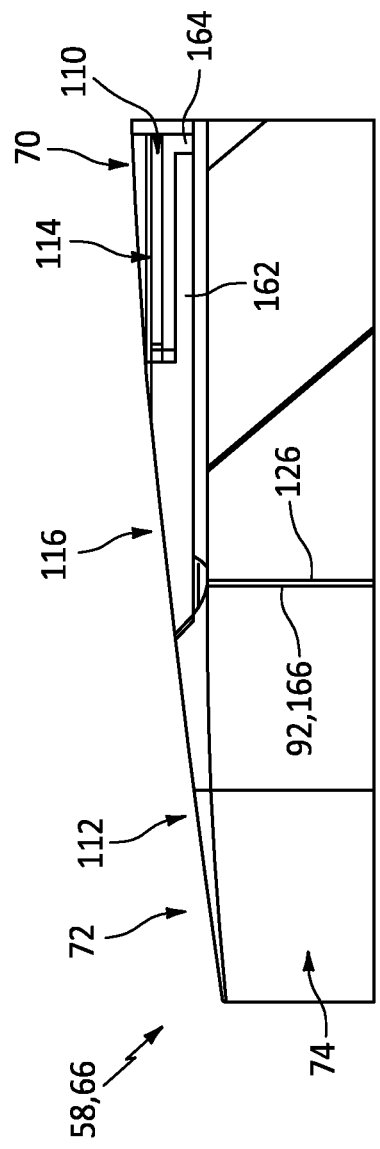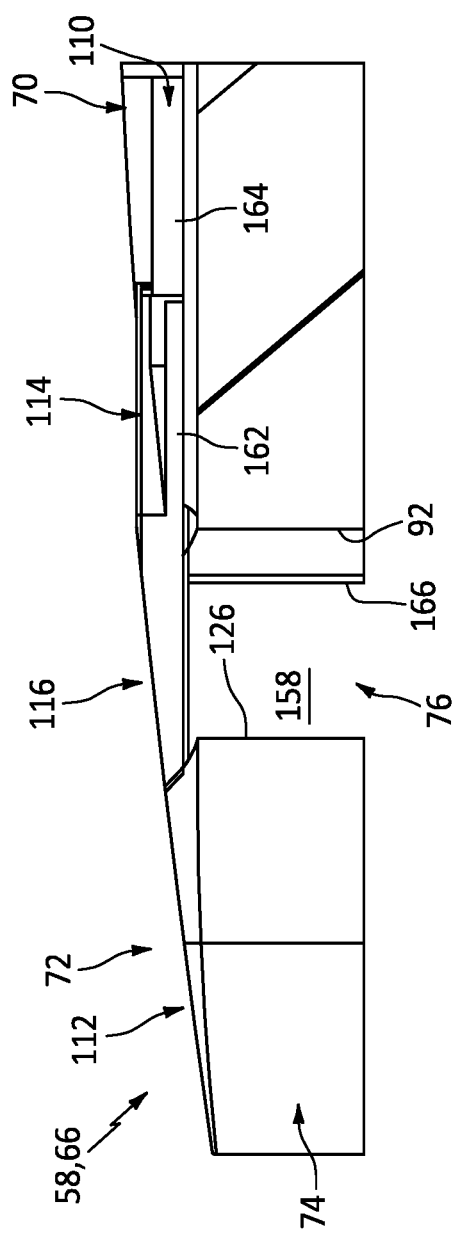

AIRCRAFT PROPULSION SYSTEM WITH VARIABLE AREA INLET

BACKGROUND

1. Technical Field

This disclosure relates generally to an aircraft propulsion system and, more particularly, to an inlet for the aircraft propulsion system with a variable airflow inlet area.

2. Background Information

An aircraft propulsion system may include an inlet structure and a gas turbine engine. The inlet structure directs air into the gas turbine engine. Some known inlet structures include a variable airflow inlet area for tailoring a mass flow of the air entering the gas turbine engine. While these known inlet structures have various advantages, there is still room in the art for improvement. There is a need in the art therefore for an improved inlet assembly with a variable airflow inlet area.

SUMMARY OF THE DISCLOSURE

According to an aspect of the present disclosure, an assembly is provided for an aircraft propulsion system. This aircraft propulsion system assembly includes a variable area inlet. The variable area inlet includes a fixed structure and a moveable structure. The variable area inlet is configured to open and close an airflow inlet passage into the aircraft propulsion system. The moveable structure is configured to move axially along a centerline between an aft position and a forward position. The moveable structure includes an inlet lip structure and a deflector. When the moveable structure is in the aft position, the airflow inlet passage is closed, and the deflector is at least partially recessed into the fixed structure. When the moveable structure is in the forward position, the airflow inlet passage is opened axially between an aft end of the inlet lip structure and a forward end of the fixed structure, and a forward end of the deflector is disposed axially at the forward end of the fixed structure.

According to another aspect of the present disclosure, another assembly is provided for an aircraft propulsion system. This aircraft propulsion system includes a variable area inlet. The variable area inlet includes a fixed structure, a moveable structure, an inner airflow inlet passage, an outer airflow inlet passage and an inlet duct. The variable area inlet is configured to regulate airflow through the outer airflow inlet passage by translating the moveable structure axially along a centerline between an aft position and a forward position. The moveable structure includes an inlet lip structure and a deflector. The inner airflow inlet passage is at a forward end of the moveable structure and is circumscribed by the inlet lip structure when the moveable structure is at the aft position and the forward position. The outer airflow inlet passage extends axially between the inlet lip structure and the fixed structure when the moveable structure is at the forward position. The deflector is configured to provide a virtual ramp into the inner airflow inlet passage when the moveable structure is at the forward position. The inlet duct is configured to receive airflow from the inner airflow inlet passage and the outer airflow inlet passage when the moveable structure is at the forward position.

According to still another aspect of the present disclosure, another assembly is provided for an aircraft propulsion system. This aircraft propulsion system includes a variable area inlet. The variable area inlet includes a fixed structure, an inlet lip structure and a deflector. The variable area inlet is configured to open and close an airflow inlet passage into the aircraft propulsion system. The inlet lip structure is configured to move axially along a centerline between an aft position and a forward position. The airflow inlet passage is closed when the inlet lip structure is at the aft position. The airflow inlet passage is opened axially between an aft end of the inlet lip structure and a forward end of the fixed structure when the inlet lip structure is at the forward position. A leading edge of the deflector is abutted radially against the fixed structure when the inlet lip structure is at the aft position. The leading edge of the deflector is disposed axially at and radially displaced from the forward end of the fixed structure when the inlet lip structure is at the forward position.

An aft end of the inlet lip structure may be axially spaced from a forward end of the fixed structure when the moveable structure is at the forward position to open the outer airflow inlet passage. The aft end of the inlet lip structure may be axially abutted with the forward end of the fixed structure when the moveable structure is at the aft position to close the outer airflow inlet passage.

A forward end of the deflector may be axially displaced from a forward end of the fixed structure when the moveable structure is at the aft position. The forward end of the deflector may be axially at, and radially spaced from, the forward end of the fixed structure when the moveable structure is at the forward position to provide the virtual ramp into the inner airflow inlet passage.

The inlet lip structure may be configured as or otherwise include a tubular inlet lip structure. The deflector may be configured as or otherwise include a tubular deflector.

A pylon may extend axially between and/or may be connected to the inlet lip structure and the deflector.

The deflector may be configured to move axially with the inlet lip structure as the moveable structure moves between the aft position and the forward position.

The deflector may be configured to form a virtual ramp into the airflow inlet passage when the moveable structure is in the forward position.

A leading edge of the deflector may be abutted radially against the fixed structure when the moveable structure is in the aft position. The leading edge of the deflector may be radially displaced from the fixed structure when the moveable structure is in the forward position.

A radius of the leading edge of the deflector to the centerline may remain uniform as the deflector moves with the moveable structure axially along the centerline between the aft position and the forward position.

A blind cavity may project axially partially into the variable area inlet when the moveable structure is in the forward position. The blind cavity may extend radially between the deflector and the fixed structure when the moveable structure is in the forward position. The variable area inlet may be configured without the blind cavity when the moveable structure is in the aft position.

The deflector may extend circumferentially about a portion of the fixed structure at the forward end of the fixed structure when the moveable structure is in the forward position.

When the moveable structure is in the aft position, the aft end of the inlet lip structure may be abutted axially against the forward end of the fixed structure.

The airflow inlet passage may extend radially through the variable area inlet when the moveable structure is in the forward position.

The assembly may also include an inlet duct. The airflow inlet passage may be configured as or otherwise include an outer airflow inlet passage. The variable area inlet may also include an inner airflow inlet passage at a forward end of the moveable structure. The inlet duct may be fluidly coupled with the inner airflow inlet passage when the moveable structure is in the aft position. The inlet duct may be fluidly coupled with the inner airflow inlet passage and the outer airflow inlet passage when the moveable structure is in the forward position.

The inlet duct may be configured to direct air received from the inner airflow inlet passage and the outer airflow inlet passage into a core flowpath and/or a bypass flowpath of the aircraft propulsion system when the moveable structure is in the forward position.

The variable area inlet may be configured to regulate airflow through the inner airflow inlet passage by moving the moveable structure between the aft position and the forward position.

The airflow inlet passage may include a plurality of ports through the variable area inlet. The ports may be arranged circumferentially about the centerline in an array.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 9 is a partial side sectional illustration of the variable area inlet with the moveable structure in an aft position.

FIG. 10 is a partial side sectional illustration of the variable area inlet with the moveable structure in a forward position.

DETAILED DESCRIPTION

Figure 1:
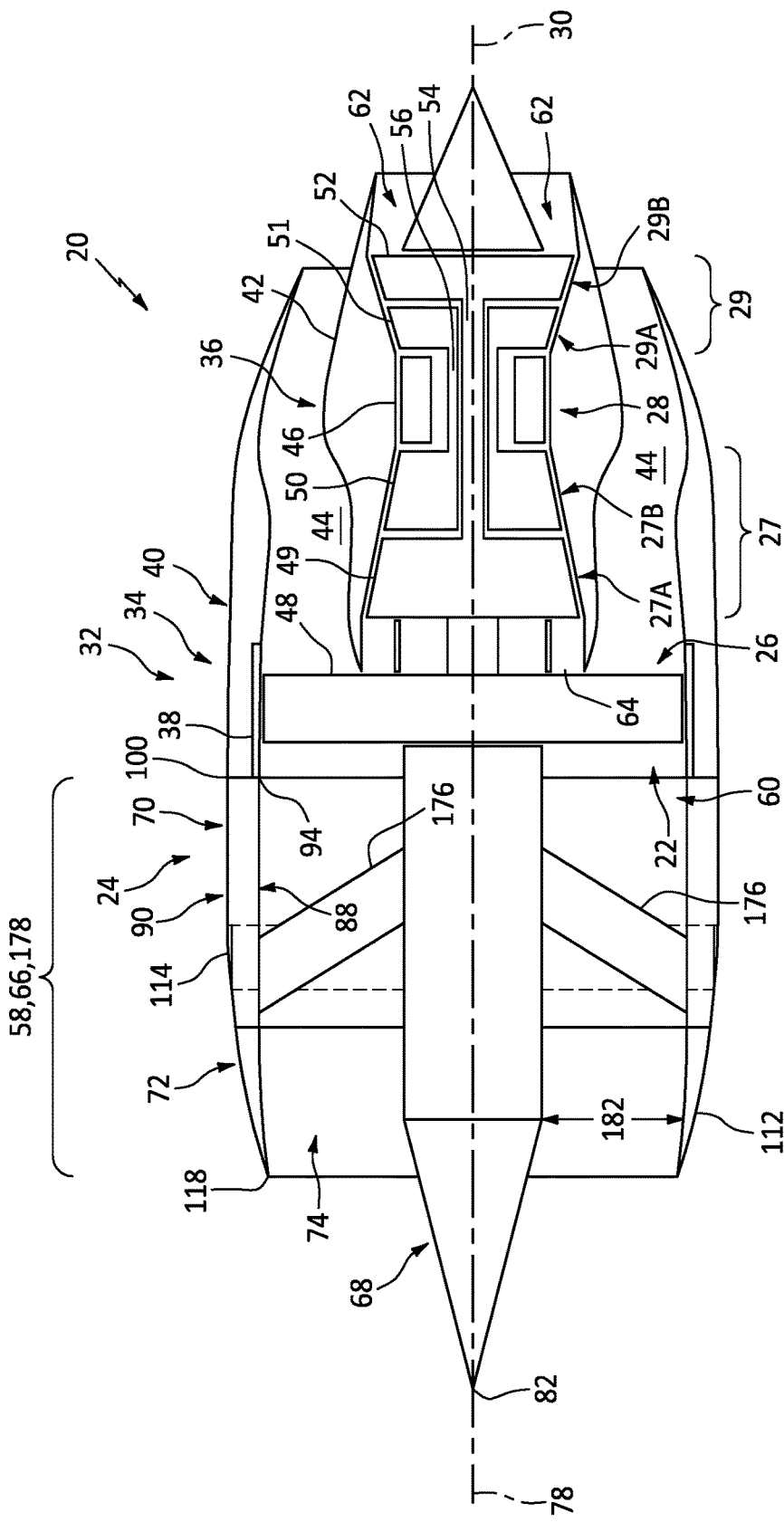
FIG. 1 is a schematic side sectional illustration of an aircraft propulsion system with a variable area inlet in a closed position.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; e.g., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; e.g., an inner nacelle structure, which may also be referred to as an inner fixed structure (IFS). More particularly, the outer nacelle structure 40 axially overlaps and extends circumferentially about (e.g., completely around) the inner nacelle structure 42. The outer nacelle structure 40 and the inner nacelle structure 42 thereby at least partially or completely form an annular bypass flowpath 44 within the aircraft propulsion system 20.

The inner housing structure 36 includes an inner case 46 (e.g., a core case) and the inner nacelle structure 42. The inner case 46 houses one or more of the engine sections 27A-29B, which engine sections 27A-29B may be collectively referred to as an engine core. The inner nacelle structure 42 houses and provides an aerodynamic cover for the inner case 46.

Each of the engine sections 26, 27A, 27B, 29A and 29B includes a bladed rotor 48-52. The fan rotor 48 and the LPC rotor 49 are connected to and driven by the LPT rotor 52 through a low speed shaft 54. The HPC rotor 50 is connected to and driven by the HPT rotor 51 through a high speed shaft 56. The shafts 54 and 56 are rotatably supported by a plurality of bearings (not shown). Each of these bearings is connected to the aircraft propulsion system housing 32 (e.g., the inner case 46) by at least one stationary structure such as, for example, an annular support strut.

During operation, air enters the aircraft propulsion system 20 through an aircraft propulsion system inlet structure 58. This air is directed through an inlet duct 60 and into an annular core flowpath 62 and the bypass flowpath 44. The core flowpath 62 extends axially along the axial centerline 30 within the aircraft propulsion system 20, through the engine sections 27A-29B, to a core nozzle outlet, where the core flowpath 62 is radially within the inner case 46. The bypass flowpath 44 extends axially along the axial centerline 30 within the aircraft propulsion system 20 to a bypass nozzle outlet, where the bypass flowpath 44 is radially between the outer nacelle structure 40 and the inner nacelle structure 42. The air within the core flowpath 62 may be referred to as "core air". The air within the bypass flowpath 44 may be referred to as "bypass air".

The core air is compressed by the compressor rotors 49 and 50 and directed into a combustion chamber of a combustor in the combustor section 28. Fuel is injected into the combustion chamber and mixed with the compressed core air to provide a fuel-air mixture. This fuel-air mixture is ignited and combustion products thereof flow through and sequentially cause the turbine rotors 51 and 52 to rotate. The rotation of the turbine rotors 51 and 52 respectively drive rotation of the compressor rotors 50 and 49 and, thus, compression of the air received from a core airflow inlet 64. The rotation of the LPT rotor 52 also drives rotation of the fan rotor 48, which propels bypass air through and out of the bypass flowpath 44. The propulsion of the bypass air may account for a majority of thrust generated by the turbine engine 22. The aircraft propulsion system 20 of the present disclosure, however, is not limited to the exemplary gas turbine engine configuration described above.

Optimal mass flow requirements of the air entering the aircraft propulsion system 20 through the aircraft propulsion system inlet structure 58 may change depending upon one or more parameters. These parameters may include, but are not limited to, modes of operation, aircraft maneuvers and operating conditions. For example, where the aircraft flies at supersonic speeds, a first mass flow of the air may be directed through the aircraft propulsion system inlet structure 58 into the aircraft propulsion system 20. When the aircraft flies at subsonic speeds, a second mass flow of the air may be directed through the aircraft propulsion system inlet structure 58 into the aircraft propulsion system 20, where the second mass flow is greater than the first mass flow.

Figure 2:
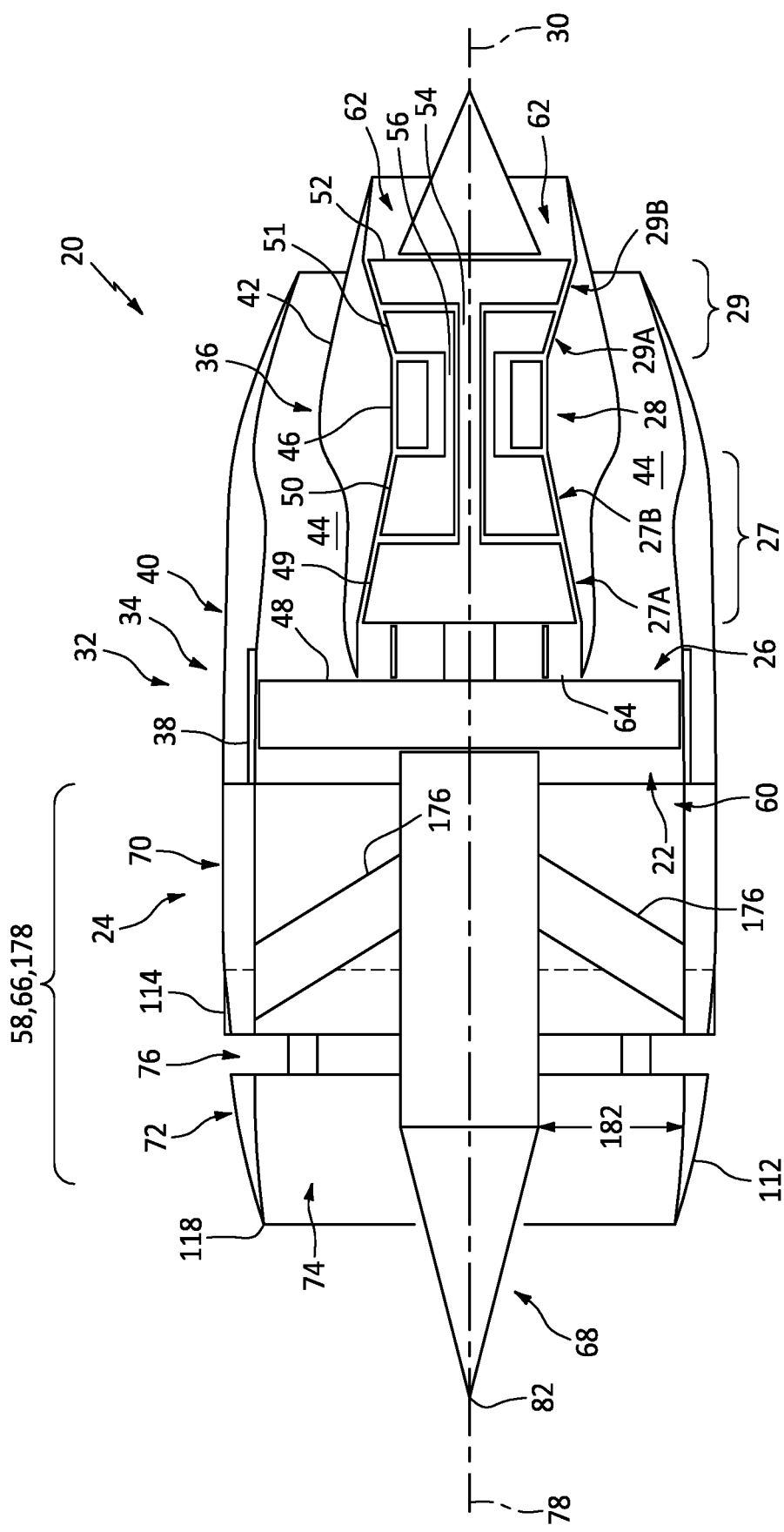
FIG. 2 is a schematic side sectional illustration of the aircraft propulsion system with the variable area inlet in an open position.

To accommodate the changing mass flow requirements for the aircraft propulsion system 20, the aircraft propulsion system inlet structure 58 is configured as a variable area inlet 66. Referring to FIGS. 1 and 2, this variable area inlet 66 includes a center body 68, an aft fixed structure 70 and a forward moveable (e.g., a translating) structure 72. These inlet components 68, 70 and 72 are configured to provide the variable area inlet 66 with an annular inner airflow inlet passage 74 and a (e.g., substantially annular) outer airflow inlet passage 76 (see FIG. 2). Briefly, the inner airflow inlet passage 74 of FIGS. 1 and 2 is configured as a primary airflow inlet passage, which inlet passage may be a variable area inlet passage or a fixed area airflow inlet passage as described below. The outer airflow inlet passage 76 of FIG. 2 is configured as a secondary airflow inlet passage, which inlet passage is a variable area airflow inlet passage.

Figure 3:
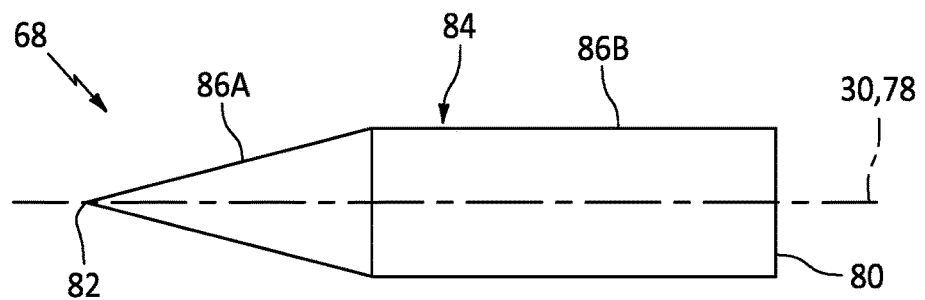
FIG. 3 is a side illustration of a center body for the variable area inlet.

Referring to FIG. 3, the center body 68 forms an inlet cone and/or an inlet spike of the aircraft propulsion system 20. The center body 68 extends axially along an axial centerline 78 (e.g., an axis) of the variable area inlet 66 (see FIGS. 1 and 2) from an aft, downstream end 80 of the center body 68 to a forward, upstream end 82 (e.g., a tip, a point) of the center body 68, which centerline 78 may be coaxial with the axial centerline 30. The center body 68 extends circumferentially about (e.g., completely around) the axial centerline 30, 78. The center body 68 extends radially outward to an outer side 84 of the center body 68.

The center body outer side 84 of FIG. 3 is configured with a partially tapered geometry. The center body 68 of FIG. 3, for example, includes a plurality of outer (e.g., exterior) surfaces 86A and 86B located at the center body outer side 84. The forward, upstream tapered surface 86A is located at the center body forward end 82. Note, the term "forward, upstream tapered surface", or "forward tapered surface" for short, may describe a surface that tapers in a forward, upstream direction. The plateau surface 86B is located at the center body aft end 80.

The forward tapered surface 86A may have a conical geometry, or another tapered geometry such as a semi-ellipsoidal geometry. The forward tapered surface 86A of FIG. 3, for example, tapers radially inward towards the axial centerline 30, 78 as the center body 68 extends axially in the forward, upstream direction along the axial centerline 30, 78 from the plateau surface 86B towards (e.g., to) the center body forward end 82.

The plateau surface 86B may have a cylindrical geometry. The plateau surface 86B of FIG. 3, for example, extends axially between and to the forward tapered surface 86A and the center body aft end 80 without, for example, significant (or any) radial displacement. More particularly, a radius from the axial centerline 30, 78 to the plateau surface 86B may remain substantially or completely constant as the plateau surface 86B extends axially along the axial centerline 30, 78. The plateau surface 86B may thereby be non-radially tapered. The present disclosure, of course, is not limited to such an exemplary center body configuration. Furthermore, in other embodiments, the center body 68 may be omitted.

Figure 4:
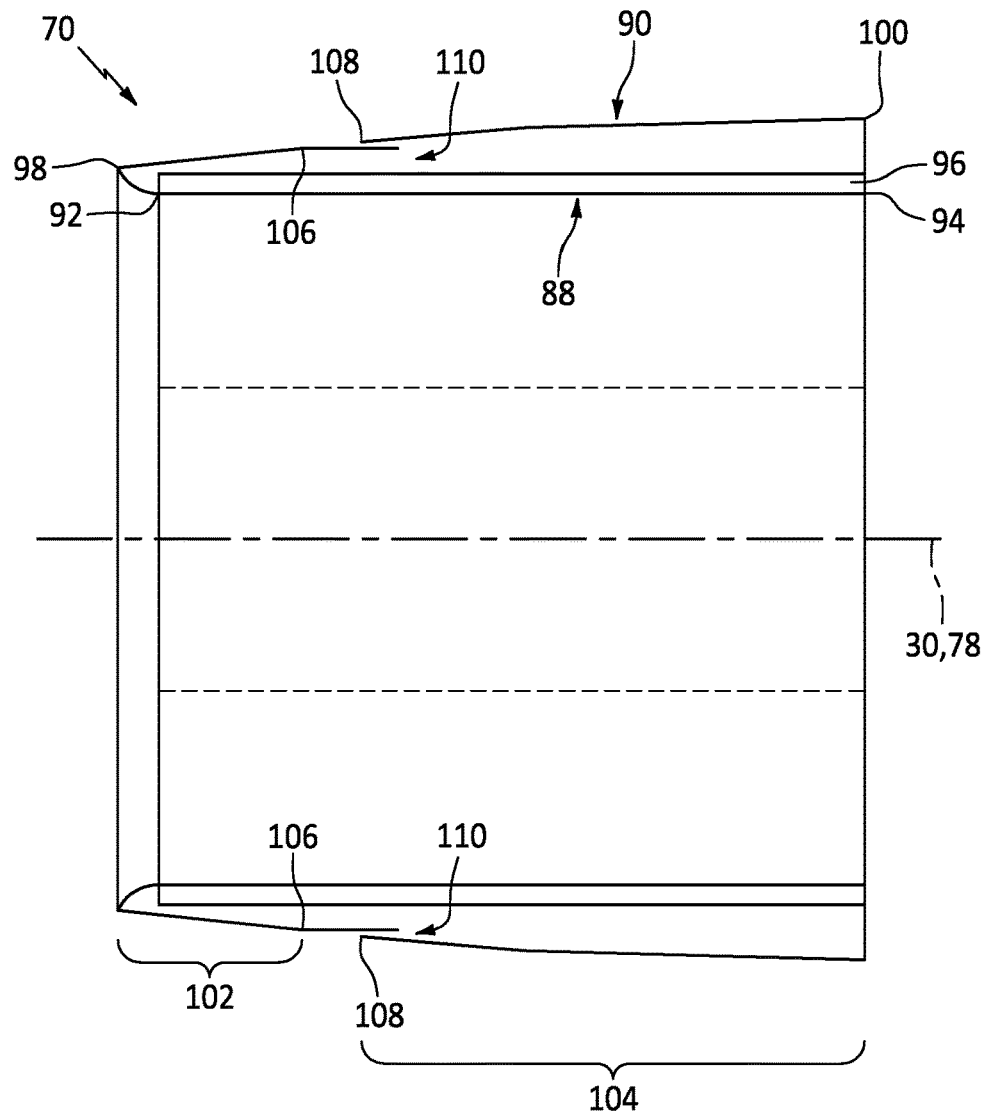
FIG. 4 is a side sectional illustration of a fixed structure for the variable area inlet.

Referring to FIG. 4, the fixed structure 70 is configured to form at least a forward portion the inlet duct 60 (see FIGS. 1 and 2). Briefly, referring to FIGS. 1 and 2, an aft portion of the inlet duct 60 may be formed by the outer case 38. However, in other embodiments, the fixed structure 70 may form an entirety of the inlet duct 60 where, for example, the gas turbine engine 22 is configured as a turbojet engine without the bypass flowpath 44. Referring again to FIG. 4, the fixed structure 70 includes a tubular inner barrel 88 and a tubular outer barrel 90.

The inner barrel 88 extends circumferentially about (e.g., completely around) the axial centerline 30, 78. The inner barrel 88 extends axially along the axial centerline 30, 78 between a forward, upstream end 92 of the inner barrel 88 and an aft, downstream end 94 of the inner barrel 88. The inner barrel aft end 94 of FIG. 1 is connected to a forward, upstream end of the outer case 38. The inner barrel 88 may be configured to attenuate noise generated during aircraft propulsion system operation and, more particularly for example, noise generated by rotation of the fan rotor. The inner barrel 88 of FIG. 4, for example, may include at least one tubular noise attenuating acoustic panel 96 or a circumferential array of arcuate noise attenuating acoustic panels 96 (see dashed lines) arranged around the axial centerline 30, 78. The present disclosure, however, is not limited to such an acoustic inner barrel configuration.

The outer barrel 90 extends circumferentially about (e.g., completely around) the axial centerline 30, 78. The outer barrel 90 extends axially along the axial centerline 30, 78 between a forward, upstream end 98 of the outer barrel 90 and an aft, downstream end 100 of the outer barrel 90. The outer barrel aft end 100 of FIG. 1 is disposed next to respective (e.g., forward, upstream) ends of a pair of fan cowls of the outer nacelle structure 40.

The outer barrel 90 of FIG. 4 includes a tubular forward segment 102 and a tubular aft segment 104. The outer barrel forward segment 102 is located at the outer barrel forward end 98. The outer barrel aft segment 104 is located at the outer barrel aft end 100. The outer barrel forward segment 102 is separated from the outer barrel aft segment 104 by an annular gap. More particularly, the gap extends axially aft and radially out from a trailing edge 106 of the outer barrel forward segment 102 to a leading edge 108 of the outer barrel aft segment 104. This gap forms an entrance of a receptacle 110 (e.g., an annular cavity) for the moveable structure 72 (see FIG. 1) in the fixed structure 70. This receptacle 110 projects axially along the axial centerline 30, 78 partially into the fixed structure 70 from the annular receptacle entrance. The receptacle 110 is located radially between the inner barrel 88 and the outer barrel 90. The receptacle 110 of FIG. 4 extends circumferentially about (e.g., completely around) the centerline 30, 78 within the fixed structure 70.

Figure 5:
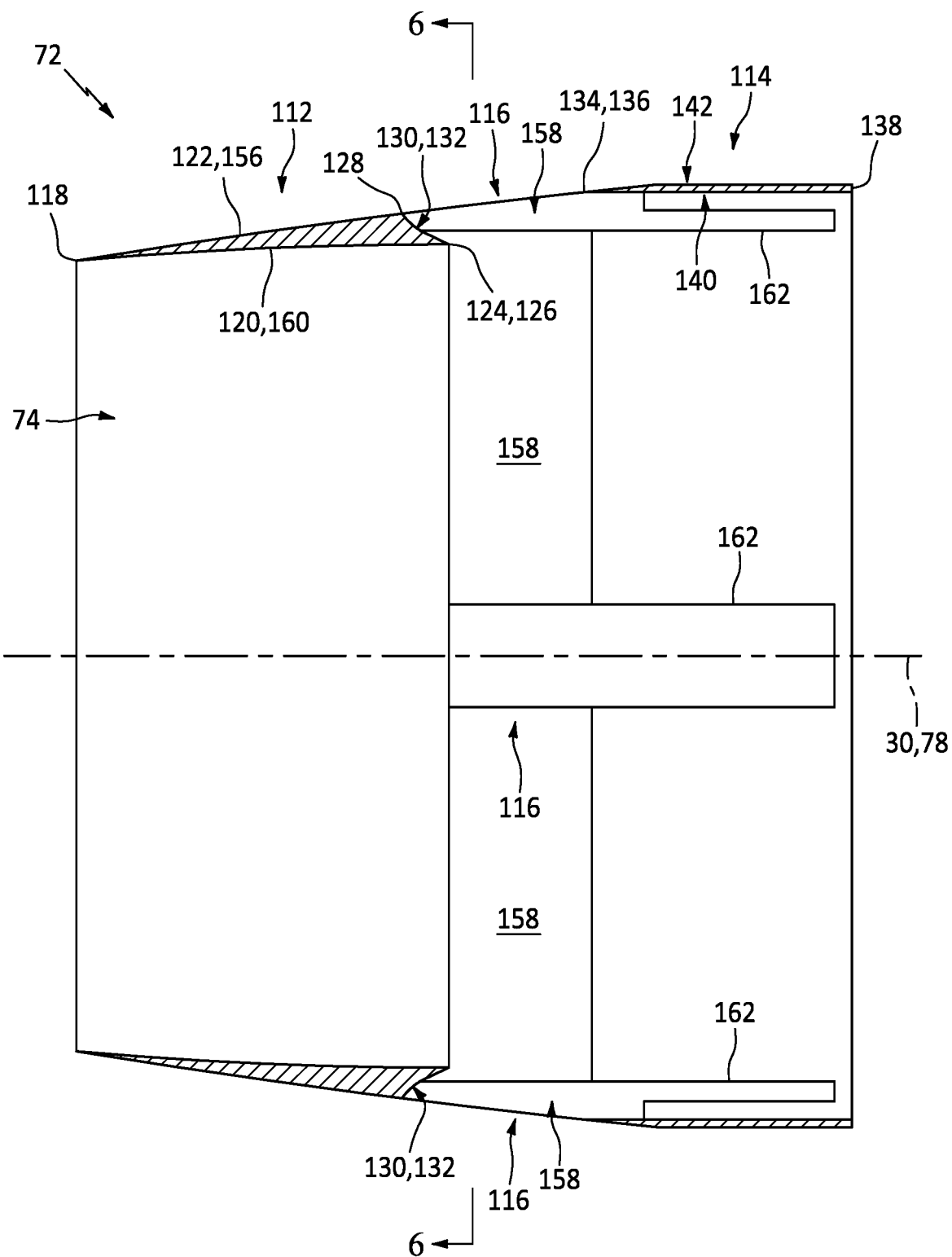
FIG. 5 is a side sectional illustration of a moveable structure for the variable area inlet.

Referring to FIG. 5, the moveable structure 72 includes a tubular inlet lip structure 112 and a tubular deflector 114. The moveable structure 72 of FIG. 5 also includes one or more pylons 116; e.g., struts, bridges, support structures, etc.

The inlet lip structure 112 forms a leading edge 118 of the nacelle 24 (see FIG. 1) as well as an outer peripheral boundary of the inner airflow inlet passage 74. The inlet lip structure 112 of FIG. 5 has a cupped (e.g., a generally V-shaped or U-shaped) side sectional geometry when viewed, for example, in a plane parallel with and/or coincident with the axial centerline 30, 78. The inlet lip structure 112 and its cupped side sectional geometry extend circumferentially about (e.g., completely around) the axial centerline 30, 78. The inlet lip structure 112 of FIG. 5, for example, includes axially overlapping inner and outer lip portions 120 and 122. The inner lip portion 120 is connected to and may be integral with the outer lip portion 122 at and along the nacelle leading edge 118. An aft, downstream end 124 of the inner lip portion 120 is located at (e.g., on, adjacent or proximate) an aft, downstream end 126 of the inlet lip structure 112. An aft, downstream end 128 of the outer lip portion 122 is also located at the lip structure aft end 126.

Figure 6:
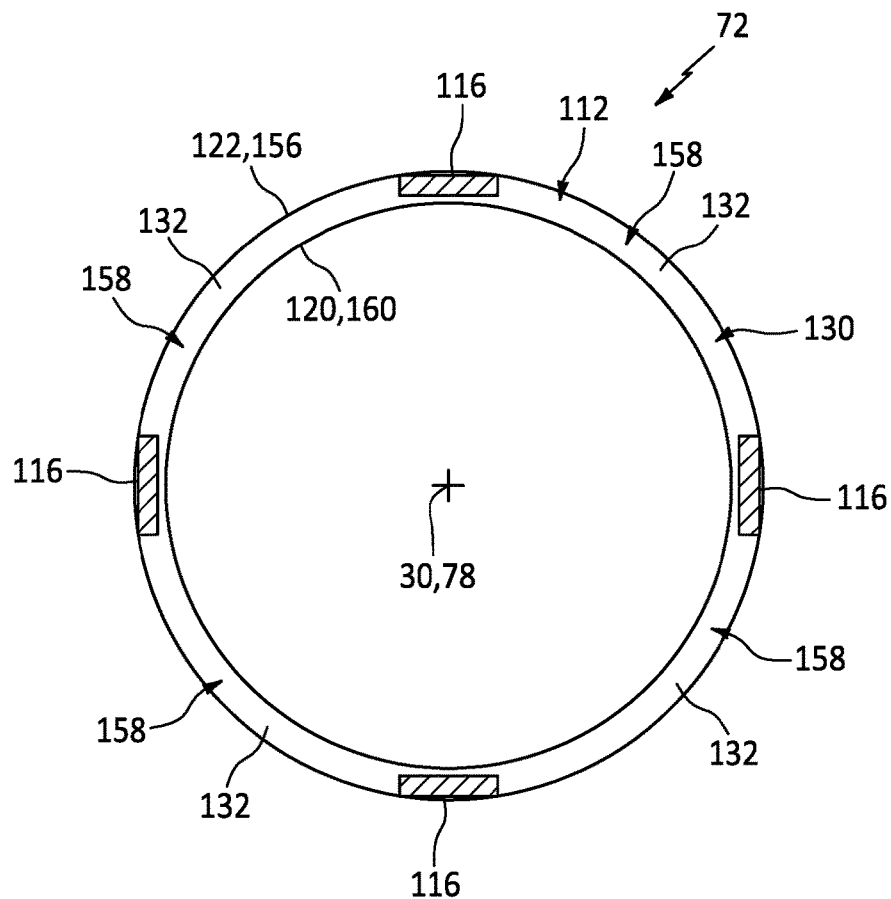
FIG. 6 is a cross-sectional illustration of the moveable structure taken along line 6-6 in FIG. 5.

Referring to FIG. 6, the inlet lip structure 112 includes an end surface 130 with one or more end surface segments 132. These end surface segments 132 are arranged circumferentially about the axial centerline 30, 78 in an (e.g., annular) array. Each of the end surface segments 132 is arranged between a respective circumferentially neighboring pair of the pylons 116. Each of the end surface segments 132 of FIG. 6, for example, is an arcuate surface segment that extends circumferentially about the axial centerline 30, 78 between and to the respective circumferentially neighboring pair of the pylons 116.

Referring to FIG. 5, each of the end surface segment 132 may be configured to provide the lip structure aft end 126 with a tapered geometry. Each end surface segment 132 of FIG. 5, for example, has a curved (e.g., a concave) sectional geometry when viewed, for example, in a plane parallel with and/or coincident with the axial centerline 30, 78. This curved end surface segment 132 tapers radially inwards as the respective end surface segment 132 extends axially in an aft, downstream direction from the aft end 128 of the outer lip portion 122 to the aft end 124 of the inner lip portion 120.

The deflector 114 extends axially along the axial centerline 30, 78 between and to a forward, upstream end 134 (e.g., a leading edge 136) of the deflector 114 and an aft, downstream end 138 of the deflector 114. The deflector 114 extends circumferentially about (e.g., completely around) the axial centerline 30, 78. The deflector 114 extends radially between and to an inner (e.g., interior) side 140 of the deflector 114 and an outer (e.g., exterior) side 142 of the deflector 114.

Figure 7:
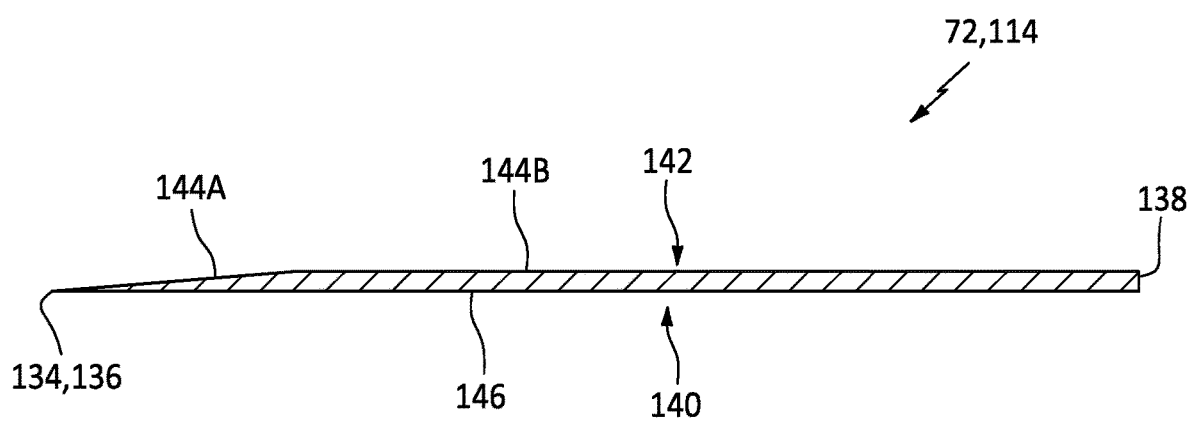
FIG. 7 is a partial side sectional illustration of a deflector for the moveable structure.

Referring to FIG. 7, the deflector outer side 142 is configured with a partially tapered geometry. The deflector 114 of FIG. 7, for example, includes a plurality of outer (e.g., exterior) surfaces 144A and 144B located at the deflector outer side 142. The forward, upstream tapered surface 144A is located at the deflector forward end 134/the deflector leading edge 136. The plateau surface 144B is located at the deflector aft end 138.

The forward tapered surface 144A may have a frustoconical geometry (e.g., the surface may have a straight sectional geometry), or another tapered geometry such as a frusto-ellipsoidal geometry (e.g., the surface may have partially elliptical or otherwise (e.g., convex) curved sectional geometry). The forward tapered surface 144A of FIG. 7, for example, tapers radially inward towards the axial centerline 30, 78 as the deflector 114 extends axially in the forward, upstream direction along the axial centerline 30, 78 from the plateau surface 144B towards (e.g., to) the deflector forward end 134/the deflector leading edge 136.

The plateau surface 144B may have a cylindrical geometry. The plateau surface 144B of FIG. 7, for example, extends axially between and to the forward tapered surface 144A and the deflector aft end 138 without, for example, significant (or any) radial displacement. More particularly, a radius from the axial centerline 30, 78 to the plateau surface 144B may remain substantially or completely constant as the plateau surface 144B extends axially along the axial centerline 30, 78. The plateau surface 144B may thereby be non-radially tapered. The present disclosure, of course, is not limited to such an exemplary deflector configuration.

The deflector inner side 140 of FIG. 7 is configured with a non-tapered geometry. The deflector 114 of FIG. 7, for example, includes an inner (e.g., interior) surface 146 located at the deflector inner side 140. This inner surface may have a cylindrical geometry. The inner surface 146 of FIG. 7, for example, extends axially between and to the deflector forward end 134 and the deflector aft end 138 without, for example, significant (or any) radial displacement. More particularly, a radius from the axial centerline 30, 78 to the inner surface 146 may remain substantially or completely constant as the inner surface 146 extends axially along the axial centerline 30, 78. The inner surface 146 may thereby be non-radially tapered. The present disclosure, of course, is not limited to such an exemplary deflector configuration.

Figure 8:
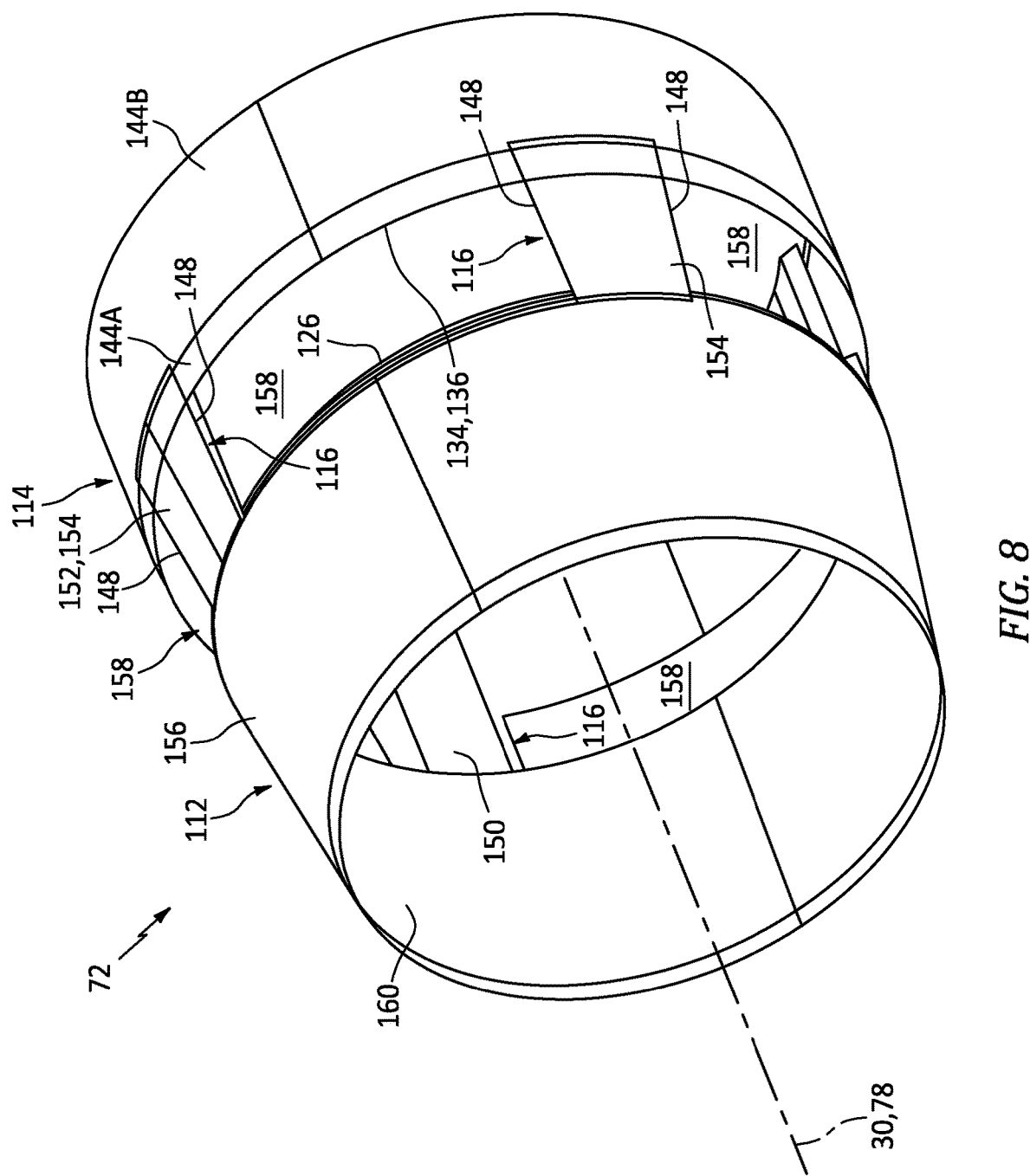
FIG. 8 is a perspective illustration of the moveable structure.

Referring to FIG. 8, the pylons 116 are configured to structurally tie the inlet lip structure 112 and the deflector 114 together. The pylons 116 of FIG. 8, for example, are arranged circumferentially about the axial centerline 30, 78 in an array. Each of the pylons 116 extends axially between and to the lip structure aft end 126 and the deflector forward end 134. Each of the pylons 116 is connected to (e.g., fixedly, structurally tied to) the inlet lip structure 112 and the deflector 114.

Each of the pylons 116 extends laterally (e.g., circumferentially or tangentially) between opposing circumferential sides 148 of the respective pylon 116. Each of the pylons 116 extends radially between and to an inner (e.g., interior) side 150 of the respective pylon 116 and an outer (e.g., exterior) side 152 of the respective pylon 116.

Each of the pylons 116 includes an outer (e.g., exterior) surface 154 located at the respective pylon outer side 152. This pylon outer surface 154 may have a polygonal shape such as, but not limited to, a (e.g., isosceles) trapezoidal shape; however, the present disclosure is not limited thereto. Each pylon outer surface 154 may be configured to follow common lines as the outer surfaces 144A and 156. The outer surfaces 144A, 154 and 156 of FIG. 8, for example, may collectively form a single aerodynamic exterior surface of the moveable structure 72; e.g., a surface with a common or continuous profile.

The pylons 116 are spaced about the axial centerline 30, 78 to provide the moveable structure 72 with one or more ports 158. Each of these ports 158 extends radially through a tubular sidewall of the moveable structure 72. Each port 158 of FIG. 8, for example, extends radially through the moveable structure 72 from the outer surfaces 144A, 154 and 156 to an inner surface 160 of the inlet lip structure 112. Each port 158 extends axially within the moveable structure 72 from the lip structure aft end 126 to the deflector forward end 134. Each port 158 extends circumferentially within the moveable structure 72 between and to respective sides 148 of a circumferentially neighboring pair of the pylons 116.

Referring to FIGS. 9-12, the moveable structure 72 is mated with the fixed structure 70. An aft end portion of the moveable structure 72 of FIGS. 9 and 10, for example, is arranged within the receptacle 110. The moveable structure 72 of FIGS. 9 and 10 is further moveably coupled with the fixed structure 70. The moveable structure 72, for example, may include one or more sliders 162, where each slider 162 is mated with and configured to slide axially along a respective track 164 within the receptacle 110. Each of the sliders 162 may be configured as an extension of a respective one of the pylons 116, or otherwise fixed to the moveable structure 72. With this configuration, the moveable structure 72 is configured to move axially along the axial centerline 30, 78 between an aft (e.g., retracted, fully closed) position (see FIG. 9) and a forward (e.g., extended, fully open) position (see FIG. 10). Note, while the centerline 30 and 78 are shown as co-axial in the drawings, the present disclosure is not limited thereto. For example, in other embodiments, the centerlines 30 and 78 may be radially offset and/or angularly offset by an angle; e.g., an acute angle.

Figure 11:
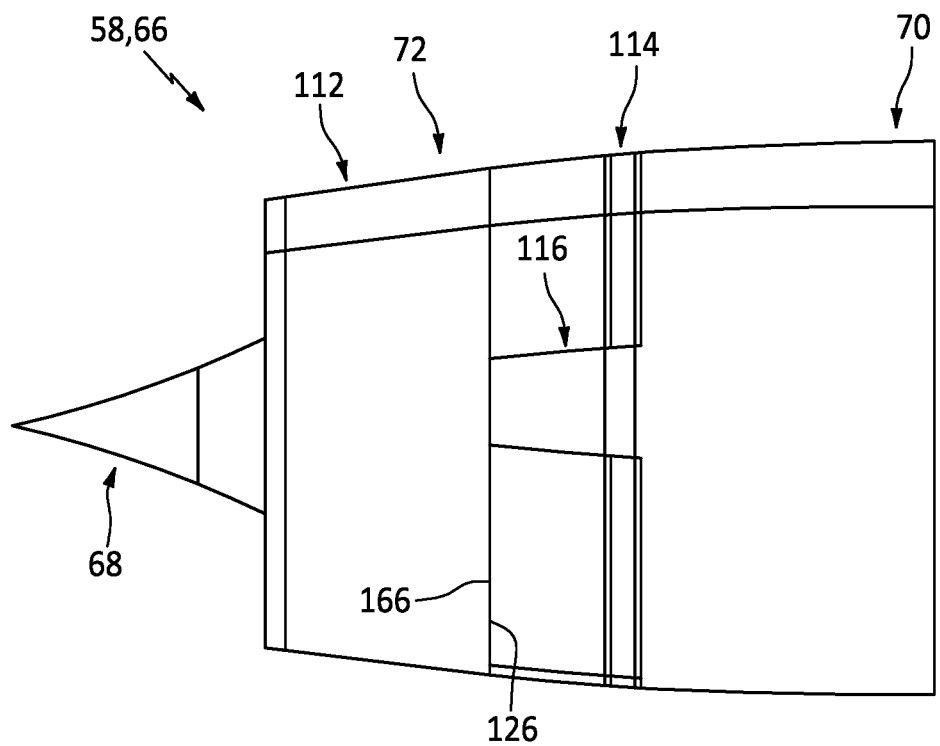
FIG. 11 is a side illustration of the variable area inlet with the moveable structure in the aft position.
Figure 13:
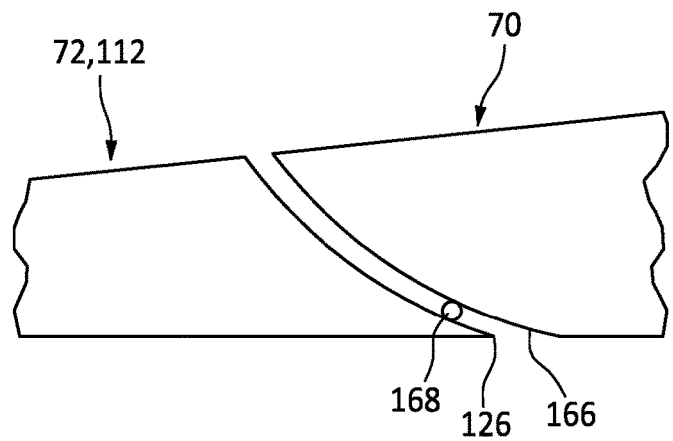
FIG. 13 is a partial side sectional illustration of an interface between the moveable structure and the fixed structure.
Figure 14:
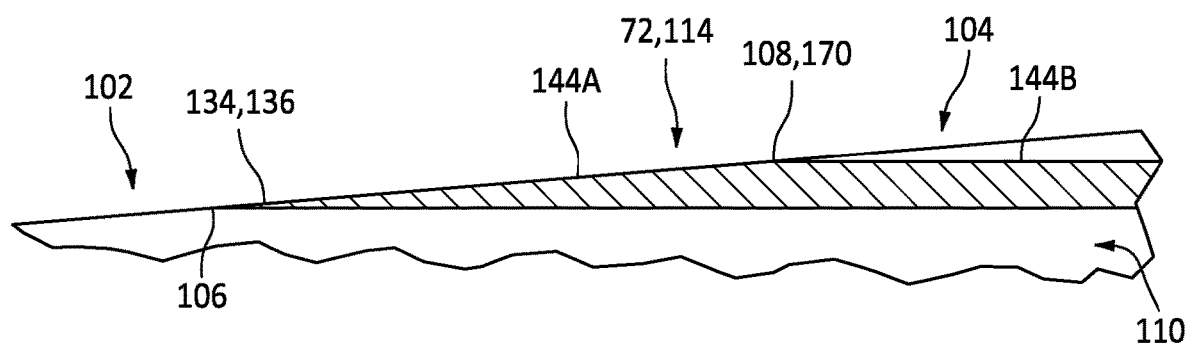
FIG. 14 is a partial side sectional illustration of another interface between the moveable structure and the fixed structure.

At the aft position of FIGS. 9 and 11, the lip structure aft end 126 is abutted axially against a forward end 166 of the fixed structure 70. The inlet lip structure 112 of FIG. 13, for example, may axially engage the fixed structure 70 through a seal element 168 such as, but not limited to, a gasket. Referring to FIG. 9, with this arrangement, each of the ports 158 (see FIG. 10) is covered and thereby closed by a respective portion of the fixed structure 70 and its outer surface. An aft end portion of the deflector 114 is stowed (e.g., received) within the receptacle 110. Referring to FIG. 14, an aft end 170 of the forward tapered surface 144A may be axially aligned with the forward end 108 of the outer barrel aft segment 104, and the deflector forward end 134 may be axially aligned with the aft end 106 of the outer barrel forward segment 102. The deflector leading edge 136 of FIG. 14 may be radially engaged with (e.g., contacting) or otherwise in close proximity with the fixed structure 70 and its forward segment 102.

Figure 12:
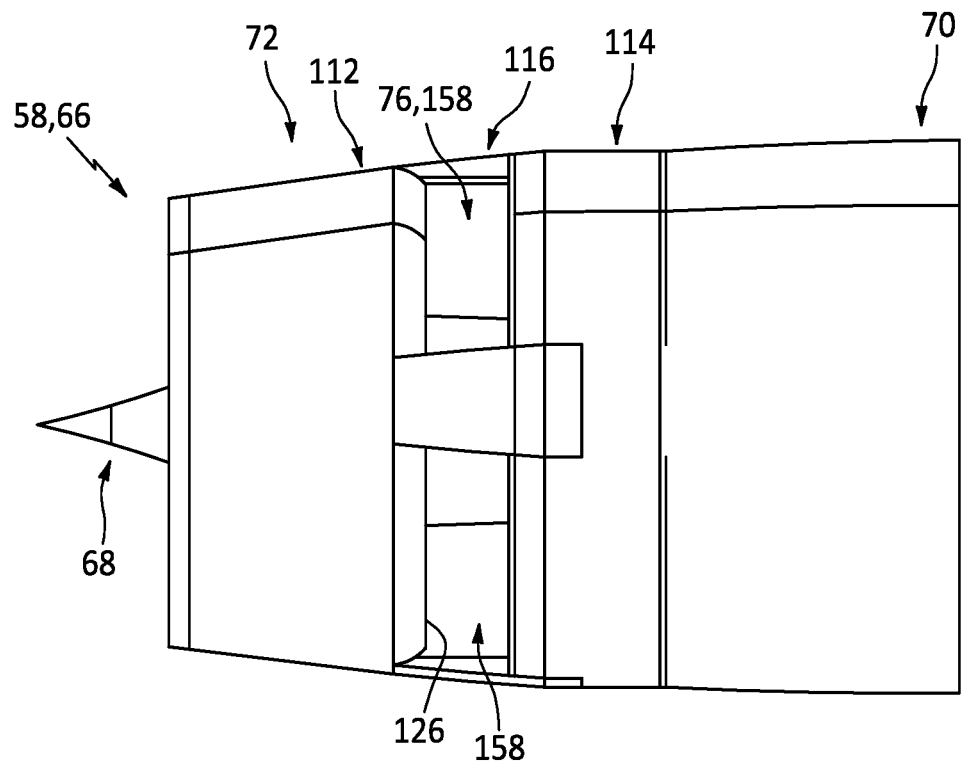
FIG. 12 is a side illustration of the variable area inlet with the moveable structure in the forward position.
Figure 15:
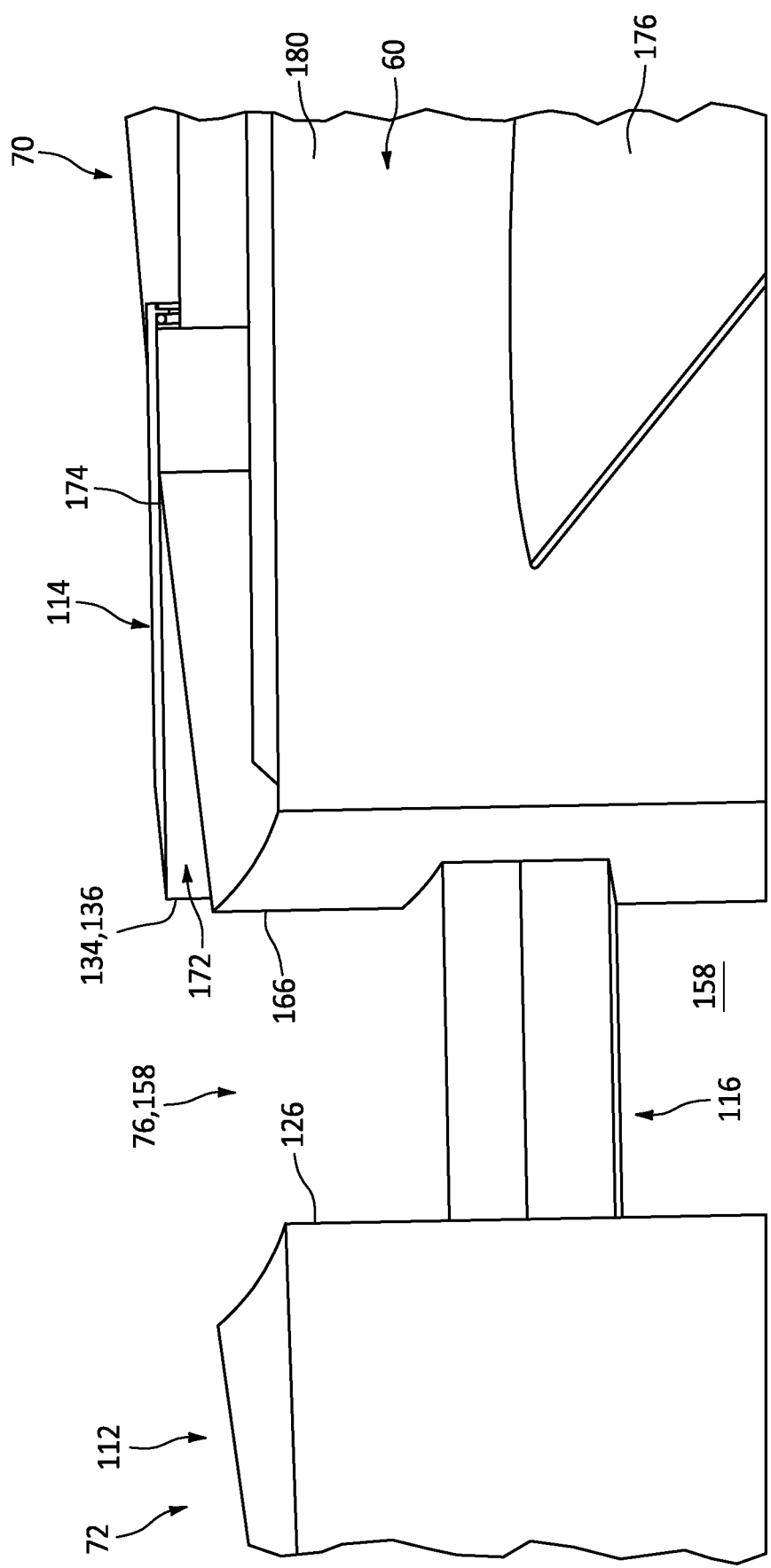
FIG. 15 is a partial perspective illustration of the variable area inlet with the moveable structure in the forward position.

At the forward position of FIGS. 10 and 12, the lip structure aft end 126 is axially displaced from the fixed structure forward end 166. With this arrangement, each of the ports 158 is uncovered by the fixed structure 70 and its outer surface and thereby opened. These open ports 158 collectively provide the outer airflow inlet passage 76 to the inlet duct 60. In addition, referring to FIG. 15, the deflector leading edge 136/the deflector forward end 134 is located at (e.g., on, adjacent or proximate) the fixed structure forward end 166. The deflector leading edge 136 of FIG. 15, for example, is substantially axially aligned with the fixed structure forward end 166. The deflector leading edge 136 and, more generally, the deflector 114 is also radially displaced (e.g., spaced) from the fixed structure 70 at its forward end 166 by a (e.g., annular) blind cavity 172. This cavity 172 extends radially between and is formed by the fixed structure 70 and the deflector 114. The cavity 172 projects axially into the variable area inlet 66 to an (e.g., sealed) interface 174 between the fixed structure 70 and the deflector 114. The cavity 172 is thereby a sealed cavity in that air (e.g., only) enters and leaves the cavity 172 from the same forward (e.g., annular) orifice. The deflector 114 may thereby provide the variable area inlet 66 with a virtual ramp into the outer airflow inlet passage 76 as described below in further detail.

Referring to FIGS. 1 and 2, the center body 68 is fixedly connected to the fixed structure 70. The center body 68 of FIGS. 1 and 2, for example, is structurally tied to the fixed structure 70 by one or more struts 176.

With the foregoing configuration, the variable area inlet components 68, 70 and 72 are configured as a valve 178. This valve 178 is configured to regulate the flow of air through at least the outer airflow inlet passage 76 to the inlet duct 60. For example, in the aft position of FIG. 1, the valve 178 is configured to (e.g., fully, completely) close the outer airflow inlet passage 76 (see FIG. 2). The valve 178 may thereby fluidly decouple the outer airflow inlet passage 76 from the inlet duct 60. However, in the forward position of FIG. 2, the valve 178 is configured to (e.g., fully, completely) open the outer airflow inlet passage 76. The valve 178 may thereby fluidly couple the outer airflow inlet passage 76 with the inlet duct 60. While the moveable structure 72 is described above as moving (e.g., axially translating) between its aft position (see FIG. 1) and its forward position (see FIG. 2), it is contemplated the moveable structure 72 may also move to one or more intermediate positions axially therebetween in order to variably modulate/regulate the flow of air through the outer airflow inlet passage 76 to the inlet duct 60.

Figure 16A:
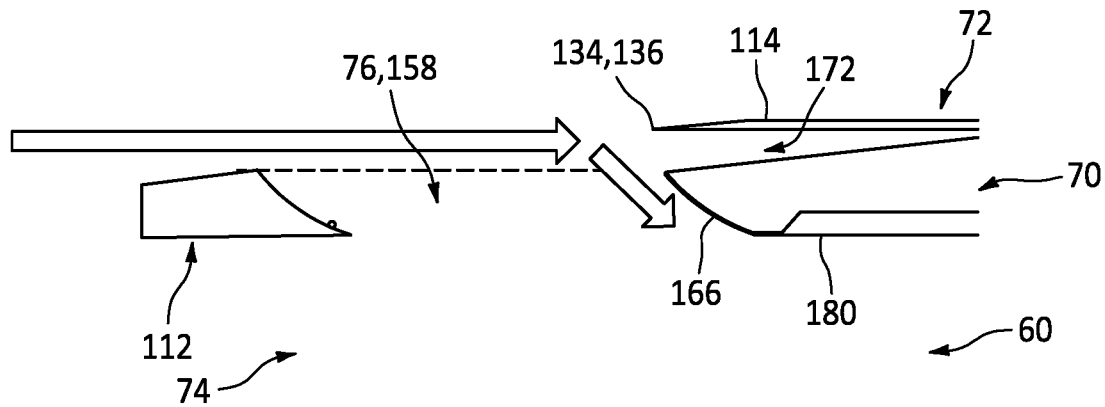
FIG. 16A illustrates air flow into an outer airflow inlet passage of the variable area inlet during a first mode of operation.
Figure 16B:
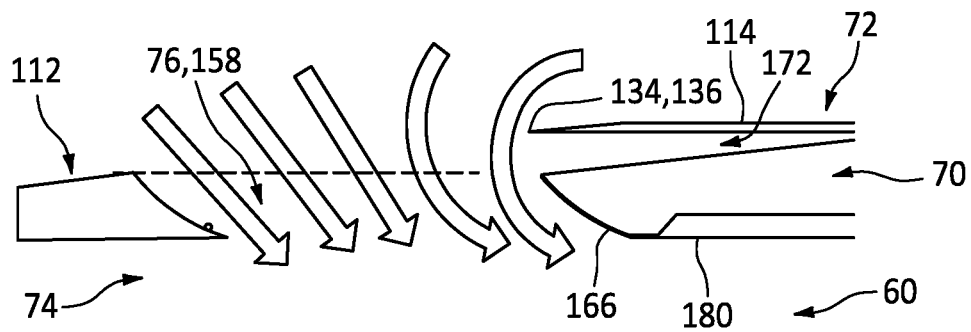
FIG. 16B illustrates air flow into the outer airflow inlet passage of the variable area inlet during a second mode of operation.
Figure 17:
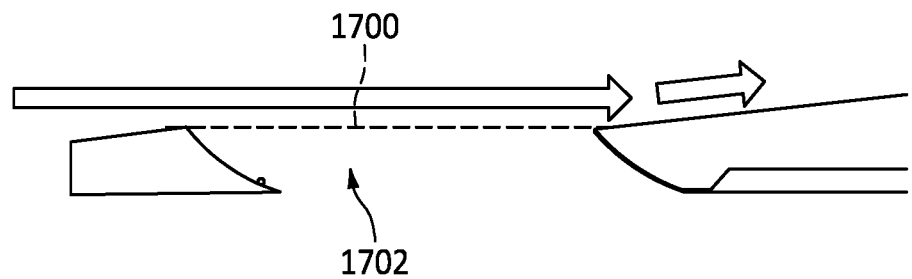
FIG. 17 illustrates air flow past an outer airflow inlet passage of a variable area inlet configured without a deflector.
Figure 18A:
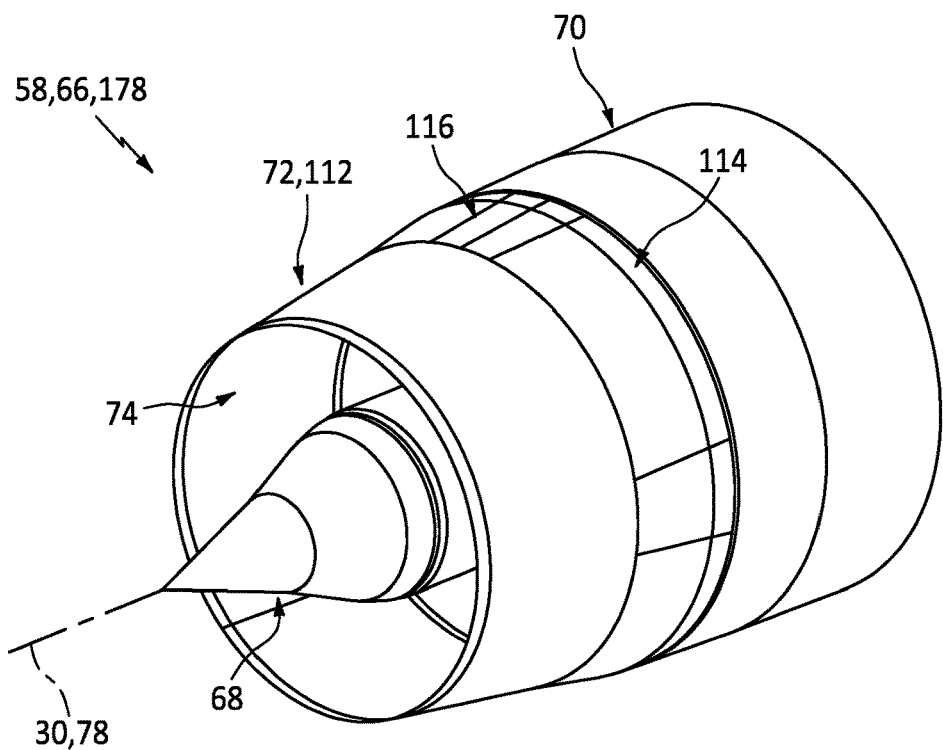
FIGS. 18A-D illustrate a sequence of the variable area inlet with the moveable structure moving from its aft position to its forward position.
Figure 18B:
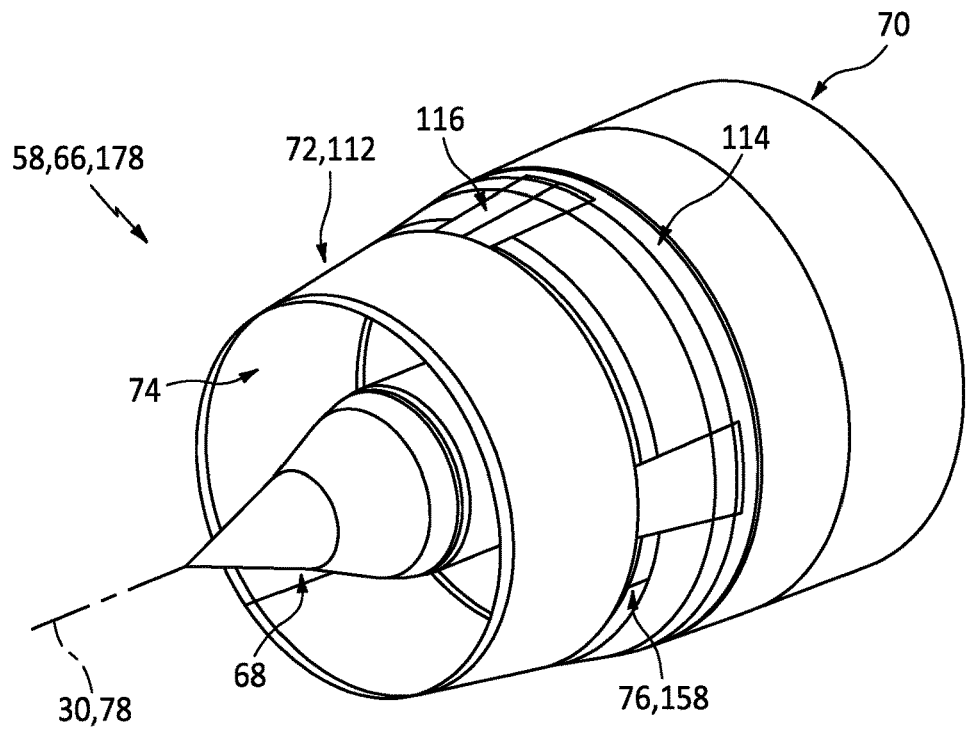
Figure 18C:
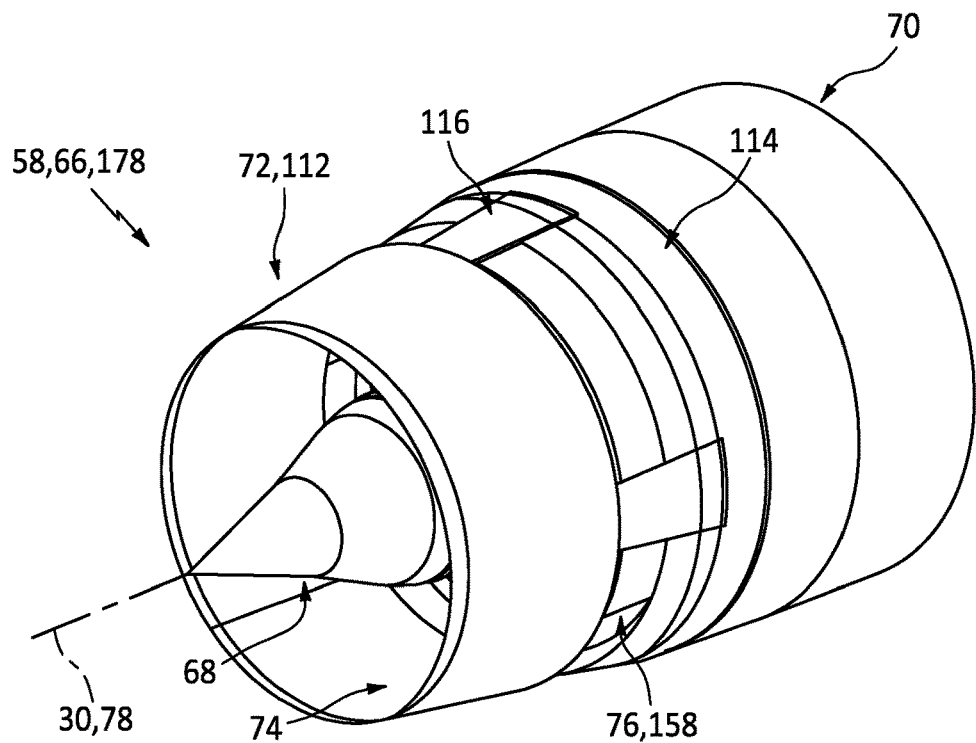
Figure 18D:
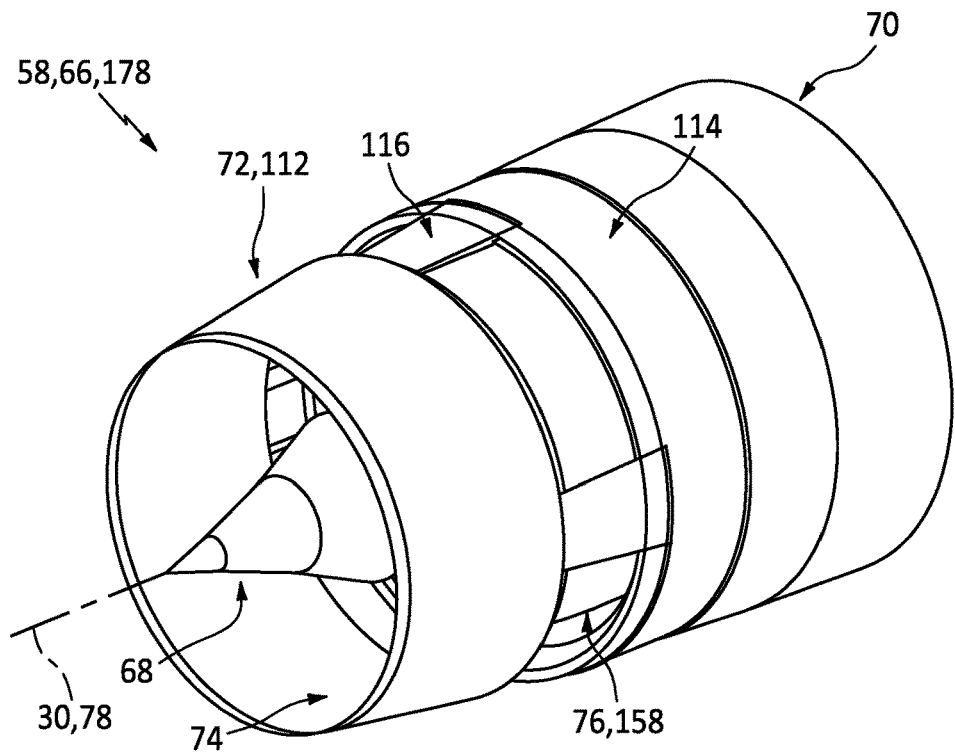

In addition to providing an additional pathway to for air to enter the inlet duct 60, the variable area inlet 66 of the present disclosure also includes the deflector 114 to direct the air into the outer airflow inlet passage 76. At the forward position of FIG. 16A during flight, the deflector 114 provides the virtual ramp (e.g., ram air scoop) into the outer airflow inlet passage 76. The deflector 114 of FIG. 16A, for example, is configured to protrude radially into boundary layer air traveling along the variable area inlet 66. The deflector 114 thereby impedes continued aft flow of the boundary layer air, and redirects that boundary layer air into the outer airflow inlet passage 76. Because the cavity 172 between the deflector 114 and the fixed structure 70 is blind (e.g., there is only one opening into/out of the cavity 172), air is pressurized within the cavity 172. This pressurized air impedes flow of additional air into the cavity 172. The pressurized air within the cavity 172 may thereby functionally create a high pressure air wall radially between the deflector 114 and the fixed structure 70 so that the air redirected by the deflector 114 enters the outer airflow inlet passage 76. The deflector 114 and its virtual ramp may thereby increase airflow into the outer airflow inlet passage 76. By contrast, if the deflector 114 was omitted as shown in FIG. 17, boundary layer air is more likely to skip past inlet 1700 to outer airflow inlet passage 1702. Referring now to FIG. 16B, the deflector 114 may also increase airflow into the outer airflow inlet passage 76 when, for example, the aircraft is on the runway by facilitating air turning and thereby minimizing separation along inner surface 180.

FIGS. 18A-D illustrate a sequence of the moveable structure 72 moving (e.g., translating) axially along the axial centerline 30, 78 from the aft (e.g., retracted, closed) position to the forward (e.g., extended, open) position. As illustrated, the deflector 114 is configured to move axially with the inlet lip structure 112. Furthermore, the deflector 114 of FIGS. 18A-D may be configured to maintain a constant radial distance from the axial centerline 30, 78 to the deflector leading edge 136. In other words, the deflector 114 may only move axially as the moveable structure 72 moves form the aft position to the forward position.

In addition to regulating air flow through the outer airflow inlet passage 76, the variable area inlet 66 of FIGS. 1 and 2 may also regulate air flow through the inner airflow inlet passage 74. For example, the inlet lip structure 112 may be arranged with the center body 68 such that a (e.g., minimum) radial distance 182 from the center body 68 to the inlet lip structure 112 at a choke point therebetween changes as the inlet lip structure 112 moves axially along the centerline 30, 78. For example, at the aft position of FIG. 1, the radial distance 182 may have a first value. At the forward position of FIG. 2, the radial distance 182 may have a second value that is different (e.g., greater) than the first value. The variable area inlet 66 may thereby further increase airflow into the inlet duct 60 by increasing a size of the inner airflow inlet passage 74. Of course, in other embodiments, the variable area inlet 66 may be configured such that the inner airflow inlet passage 74 is a fixed area passage.

Figure 19A:
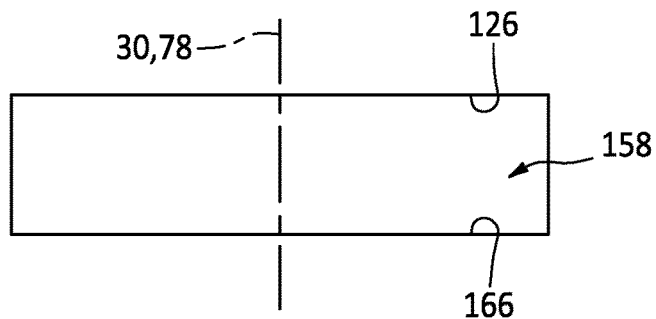
FIGS. 19A-E illustrate various different port configurations for the variable area inlet.
Figure 19B:
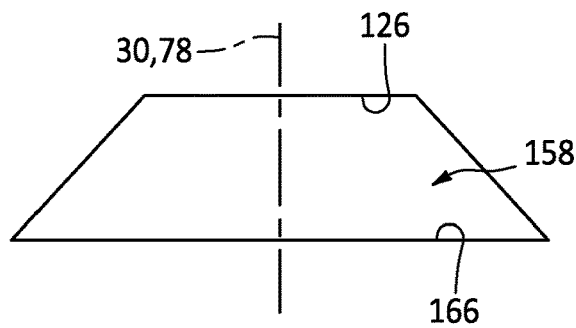
Figure 19C:
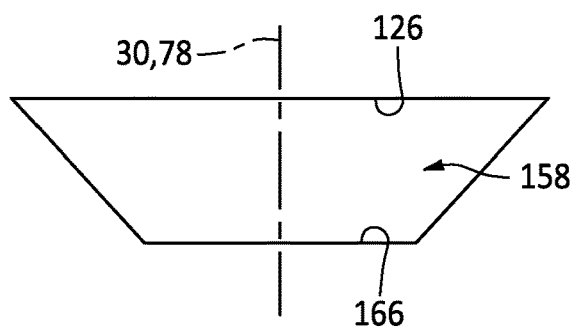
Figure 19D:
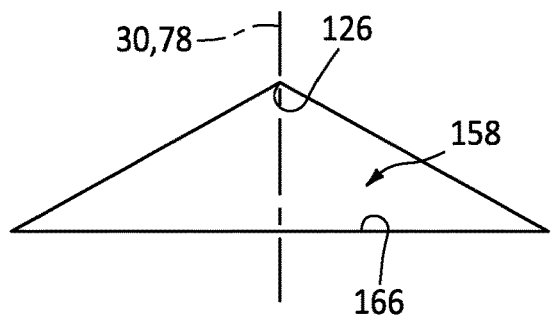
Figure 19E:
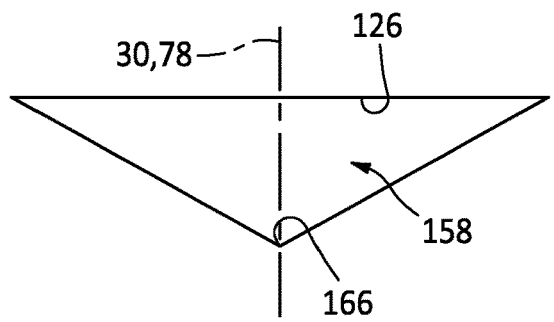

Referring to FIG. 19A-E, each of the ports 158 has a cross-sectional geometry when viewed, for example, in a plane perpendicular to a longitudinal axis of the respective port 158. This cross-sectional geometry may be polygonal, or another shape. For example, referring to FIG. 19A, the cross-sectional geometry may be rectangular. Referring to FIGS. 19B and 19C, the cross-sectional geometry may be (e.g., isosceles or asymmetrical) trapezoidal. Referring to FIGS. 19D and 19E, the cross-sectional geometry may be (e.g., isosceles or asymmetrical) triangular. Where the port 158 is tapered, the port 158 may taper in the forward, upstream direction as shown, for example, in FIGS. 19B and 19D. Alternatively, the port 158 may taper in the aft, downstream direction as shown, for example, in FIGS. 19C and 19E. Tapering the port 158 may facilitate tuning of how fast and when additional air flows through the outer airflow inlet passage 76 as the moveable structure 72 moves between its aft and forward positions.

Figure 20A:
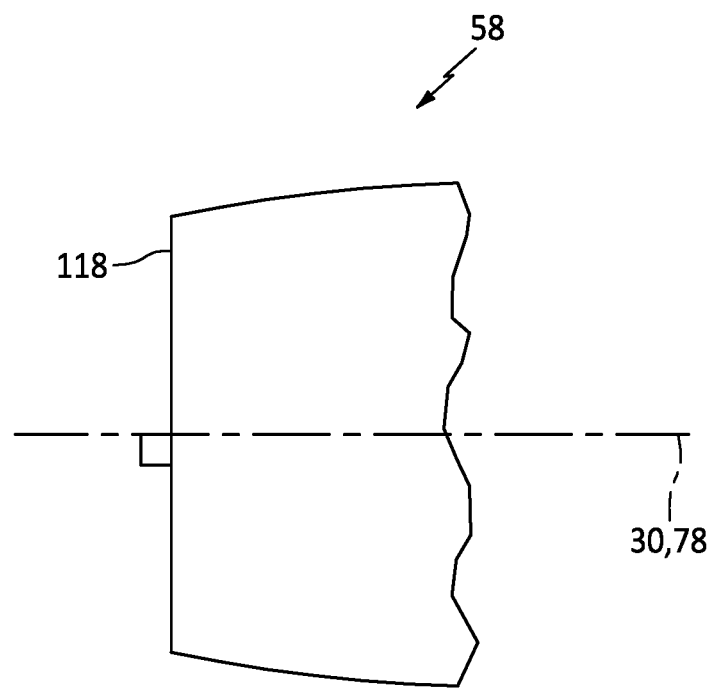
FIG. 20A is a partial side illustration of the aircraft propulsion system with a non-scarfed inlet structure.
Figure 20B:
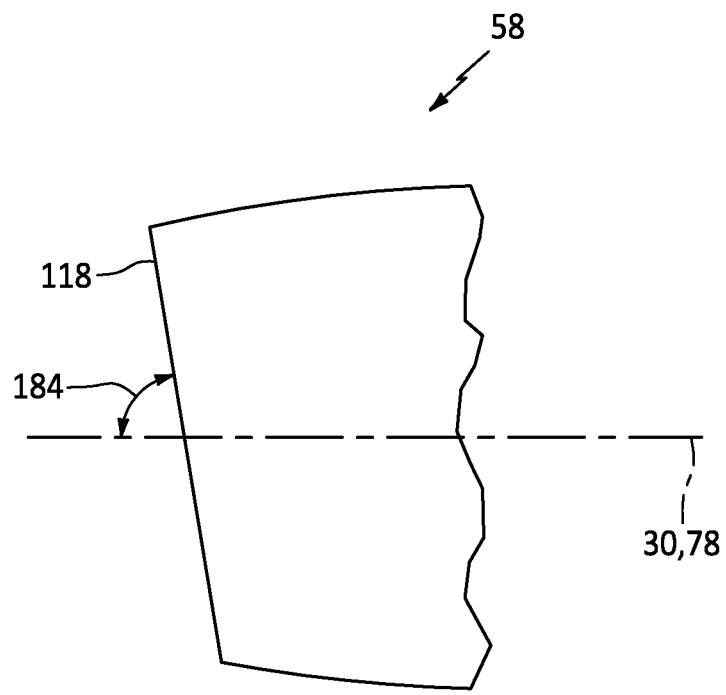
FIG. 20B is a side illustration of the aircraft propulsion system with a scarfed inlet structure.

The aircraft propulsion system inlet structure 58 may be configured as a non-scarfed inlet structure or as a scarfed inlet structure. The term "non-scarfed" may describe an inlet structure where a plane defined by its leading edge (e.g., 118 in FIG. 20A) is perpendicular to the axial centerline 30, 78. The term "scarfed" may describe an inlet structure where the plane defined by its leading edge (e.g., 118 in FIG. 20B) is angularly offset from the axial centerline 30, 78 an acute angle 184.

The aircraft propulsion system inlet structure 58 and its components (e.g., 70, 72) may extend circumferentially completely around the axial centerline 30, 78. Alternatively, the aircraft propulsion system inlet structure 58 and/or any one or more of its components (e.g., 70, 72) may extend partially circumferentially around the axial centerline 30, 78 such that the inner airflow inlet passage 74 is partially annular (e.g., with the center body 68), or partially circular, partially elliptical, etc. (e.g., without the center body 68). In still other embodiments, the aircraft propulsion system inlet structure 58 may be configured with a polygonal (e.g., rectangular) inner airflow inlet passage 74 and/or outer airflow passage 76. The present disclosure, of course, is not limited to the exemplary passage 74, 76 geometries described above.

The aircraft propulsion system 20 and its variable area inlet 66 may be configured with various gas turbine engines other than the one described above. The gas turbine engine, for example, may be configured as a geared or a direct drive turbine engine. The gas turbine engine may be configured with a single spool, with two spools (e.g., see FIG. 1), or with more than two spools. The gas turbine engine may be configured as a turbofan engine, a turbojet engine or any other type of turbine engine. The present invention therefore is not limited to any particular types or configurations of gas turbine engines. The present disclosure is also not limited to applications where the aircraft is capable of traveling supersonic speeds.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
 a variable area inlet comprising a fixed structure and a moveable structure, the variable area inlet configured to open and close an airflow inlet passage into the aircraft propulsion system;
 the moveable structure configured to move axially along a centerline between an aft position and a forward position, and the moveable structure comprising an inlet lip structure and a deflector;
 wherein, when the moveable structure is in the aft position, the airflow inlet passage is closed, and the deflector is at least partially recessed into the fixed structure; and
 wherein, when the moveable structure is in the forward position, the airflow inlet passage is opened axially between an aft end of the inlet lip structure and a forward end of the fixed structure, and a forward end of the deflector is disposed axially at the forward end of the fixed structure;
 wherein a blind cavity projects axially partially into the variable area inlet when the moveable structure is in the forward position; and wherein the blind cavity extends radially between the deflector and the fixed structure when the moveable structure is in the forward position.

2. The assembly of claim 1, wherein
the inlet lip structure comprises a tubular inlet lip structure; and
the deflector comprises a tubular deflector.

3. The assembly of claim 1, wherein a pylon extends axially between and is connected to the inlet lip structure and the deflector.

4. The assembly of claim 1, wherein the deflector is configured to move axially with the inlet lip structure as the moveable structure moves between the aft position and the forward position.

5. The assembly of claim 1, wherein the deflector is configured to form a virtual ramp into the airflow inlet passage when the moveable structure is in the forward position.

6. The assembly of claim 1, wherein
a leading edge of the deflector is abutted radially against the fixed structure when the moveable structure is in the aft position; and
the leading edge of the deflector is radially displaced from the fixed structure when the moveable structure is in the forward position.

7. The assembly of claim 6, wherein a radius of the leading edge of the deflector to the centerline remains uniform as the deflector moves with the moveable structure axially along the centerline between the aft position and the forward position.

8. The assembly of claim 1, wherein the variable area inlet is configured without the blind cavity when the moveable structure is in the aft position.

9. The assembly of claim 1, wherein the deflector extends circumferentially about a portion of the fixed structure at the forward end of the fixed structure when the moveable structure is in the forward position.

10. The assembly of claim 1, wherein, when the moveable structure is in the aft position, the aft end of the inlet lip structure is abutted axially against the forward end of the fixed structure.

11. The assembly of claim 1, wherein the airflow inlet passage extends radially through the variable area inlet when the moveable structure is in the forward position.

12. The assembly of claim 1, further comprising:
an inlet duct;
the airflow inlet passage comprising an outer airflow inlet passage, and the variable area inlet further comprising an inner airflow inlet passage at a forward end of the moveable structure;
the inlet duct fluidly coupled with the inner airflow inlet passage when the moveable structure is in the aft position, and the inlet duct fluidly coupled with the inner airflow inlet passage and the outer airflow inlet passage when the moveable structure is in the forward position.

13. The assembly of claim 12, wherein the inlet duct is configured to direct air received from the inner airflow inlet passage and the outer airflow inlet passage into at least one of a core flowpath or a bypass flowpath of the aircraft propulsion system when the moveable structure is in the forward position.

14. The assembly of claim 12, wherein the variable area inlet is configured to regulate airflow through the inner airflow inlet passage by moving the moveable structure between the aft position and the forward position.

15. The assembly of claim 1, wherein
the airflow inlet passage comprises a plurality of ports through the variable area inlet; and
the plurality of ports are arranged circumferentially about the centerline in an array.

16. An assembly for an aircraft propulsion system, comprising:
a variable area inlet comprising a fixed structure, a moveable structure, an inner airflow inlet passage, an outer airflow inlet passage and an inlet duct, the variable area inlet configured to regulate airflow through the outer airflow inlet passage by translating the moveable structure axially along a centerline between an aft position and a forward position, and the moveable structure including an inlet lip structure and a deflector;
the inner airflow inlet passage at a forward end of the moveable structure and circumscribed by the inlet lip structure when the moveable structure is at the aft position and the forward position;
the outer airflow inlet passage extending axially between the inlet lip structure and the fixed structure when the moveable structure is at the forward position, and the deflector configured to provide a virtual ramp into the inner airflow inlet passage when the moveable structure is at the forward position; and
the inlet duct configured to receive airflow from the inner airflow inlet passage and the outer airflow inlet passage when the moveable structure is at the forward position;
wherein a blind cavity projects axially partially into the variable area inlet when the moveable structure is in the forward position; and
wherein the blind cavity extends radially between the deflector and the fixed structure when the moveable structure is in the forward position.

17. The assembly of claim 16, wherein
an aft end of the inlet lip structure is axially spaced from a forward end of the fixed structure when the moveable structure is at the forward position to open the outer airflow inlet passage; and
the aft end of the inlet lip structure is axially abutted with the forward end of the fixed structure when the moveable structure is at the aft position to close the outer airflow inlet passage.

18. The assembly of claim 16, wherein
a forward end of the deflector is axially displaced from a forward end of the fixed structure when the moveable structure is at the aft position; and
the forward end of the deflector is axially at, and radially spaced from, the forward end of the fixed structure when the moveable structure is at the forward position to provide the virtual ramp into the inner airflow inlet passage.

19. An assembly for an aircraft propulsion system, comprising:
a variable area inlet comprising a fixed structure, an inlet lip structure and a deflector, the variable area inlet configured to open and close an airflow inlet passage into the aircraft propulsion system;
the inlet lip structure configured to move axially along a centerline between an aft position and a forward position, the airflow inlet passage closed when the inlet lip structure is at the aft position, and the airflow inlet passage is opened axially between an aft end of the inlet lip structure and a forward end of the fixed structure when the inlet lip structure is at the forward position; and a leading edge of the deflector abutted radially against the fixed structure when the inlet lip structure is at the aft position, and the leading edge of the deflector disposed axially at and radially displaced from the forward end of the fixed structure when the inlet lip structure is at the forward position;

wherein a blind cavity projects axially partially into the variable area inlet when the inlet lip structure is in the forward position; and wherein the blind cavity extends radially between the deflector and the fixed structure when the inlet lip structure is in the forward position.

* * * * *